Aug. 4, 1936.　　　　F. E. RICE　　　　2,049,663
FAUCET
Filed Aug. 22, 1934
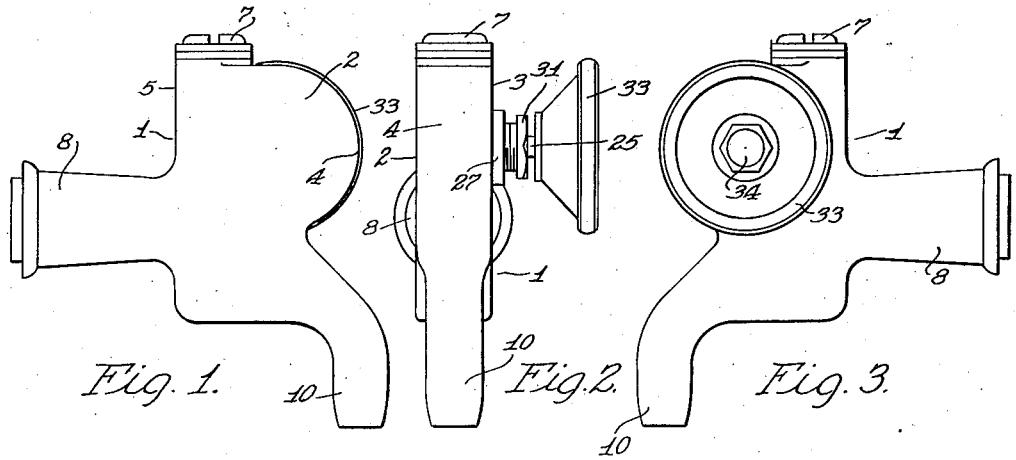
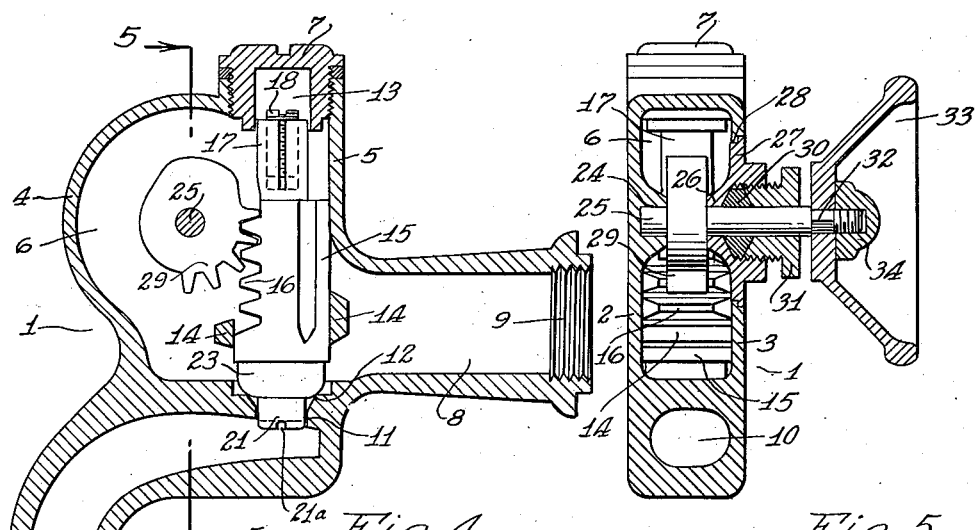
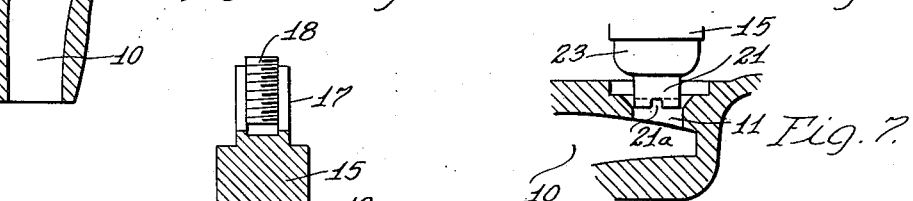
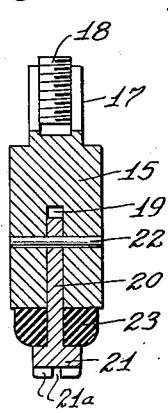
INVENTOR
Frank E. Rice
BY
ATTORNEYS Patented Aug. 4, 1936

2,049,663

UNITED STATES PATENT OFFICE 2,049,663

FAUCET

Frank E. Rice, Detroit, Mich., assignor to American Tap Bush Company, Detroit, Mich., a corporation of Delaware Application August 22, 1934, Serial No. 740,985

3 Claims. (Cl. 251—27)

The present invention pertains to a novel faucet for controlling the flow of fluids and liquids, the faucet being more particularly designed for use as a water faucet.

The primary object of the present invention is to provide a valve wherein the pressure of the water in a line upon which it is mounted acts to positively maintain a valve element upon its seat. In utilizing the pressure of the water to seat the valve element difficulty was encountered in that as the valve element is moved into close proximity to its valve seat the pressure of the water caused the valve element to close very rapidly with the result that the flow of water was very abruptly stopped. Such abrupt stopping of the water flow was found to have destructive effect upon the piping system in that it set up a hammering action, or in other words, an excessive amount of vibration. Such vibration, however, has been overcome in the present device by the provision of a specially devised valve element which functions to gradually slow down the rate of flow of the water so that as the valve element is finally brought into engagement with its seat the complete stopping off of the water flow is gradual and not sufficiently abrupt to set up any vibration.

Another object of the present invention is to provide a faucet having a valve element which may be readily removed for repair or replacement, and an actuating means for the valve element which cannot at any time be removed.

With the above and other ends in view reference is had to the accompanying drawing, in which Figure 1 is a side elevation;

Fig. 2 is a front elevation;

Fig. 3 is another side elevation;

Fig. 4 is a vertical cross section;

Fig. 5 is a cross section taken on the line 5—5 of Fig. 4;

Fig. 6 is a cross section of the valve element, and

Fig. 7 is a cross sectional detail.

The faucet comprises a hollow body generally designated 1, the body having substantially parallel vertical side walls 2 and 3 closed at the front by a wall 4, the latter being arcuately shaped when viewed as in Fig. 4. The rear wall 5 of the valve body co-operates with the walls 2, 3, and 4 in completing a closed chamber 6 to which access may be had by the provision of a removable plug 7 in the top thereof. Opening into the chamber 6 is an inlet port 8, the latter being provided by forming a tubular projection on the body 1. The faucet body is attached to any suitable water pipe line system by means of screw threads 9.

An outlet port 10 communicates with the faucet chamber 6 through a bore 11, the bore 11 being counterbored at its upper end to provide a valve seat 12. The bore 11, valve seat 12 and plug 7 are disposed in co-axial alignment, and the plug 7 is provided with an axial bore 13. Co-axial with the bores 11 and 13 are provided guides 14.

As shown more clearly in Figs. 4 and 6, a valve element 15 is provided with rack teeth 16 and a slotted pilot 17 receiving a set screw 18. The valve element 15 is axially pierced as at 19 to receive a stem 20 having an enlarged head 21 formed thereon. The head 21 is very slightly tapered toward its lower end and it will be understood that the amount of taper shown in the drawing has been exaggerated for the purpose of illustration. In the actual construction the diameter of the smallest point is from two to four one thousandths smaller than at the largest point. The stem 20 is retained in the valve element 15 by a diametrically extending pin 22 and a compressible valve head 23 is sleeved on the stem 20 and is interposed between the head 21 and the bottom of the valve element 15. The outer end of the head 21 is formed with grooves 21a.

The valve element 15 is assembled in the faucet by removing the plug 7 and inserting the element in the guides 14 and then replacing the plug. The valve element will thus be disposed with the tapered head 21 extending into the bore 11, the compressible valve head 23 resting on the seat 12, and the pilot 17 slidably received in the bore 13.

The wall 2 is formed with a bearing 24 rotatably supporting one end of a shaft 25, the other end of the shaft extending through a bearing 26 in a disk 27 which is permanently secured, as by soldering, in an opening 28 in the wall 3. On the shaft 25 is provided a gear sector 29 which meshes with the rack teeth 16 on the valve element 15. In the disk 27 is provided a packing element 30 and a plug 31 for compressing the same. On the outer end of the shaft 25 is provided a squared or angular portion 32 receiving a handle 33 which is secured in place by a nut 34.

In operation, water under pressure enters the chamber 6 through the inlet port 8 and acts upon the valve element 15 and pilot 17 to force the compressible valve head 23 into engagement with the seat. The small amount of movement of the valve element necessary for such a function is derived by providing a slight amount of looseness in the meshing of the gear segment 29 with the rack teeth 16, so that if the valve element should be moved into close proximity to the seat by rotating the handle 33 a small amount of movement can take place without further rotation of the handle. Upon rotation of the handle 33 with the parts positioned as shown in Fig. 4 the valve element is caused to be raised so that the valve head 23 is lifted from the seat 12 and the tapered head 21 is withdrawn from the bore 11. As the valve head 23 is unseated flow of water can take place through the bore 11, and the rate of flow gradually increases as the tapered head 21 is withdrawn from the bore. The clearance between the head 21 and the wall of the bore 11 has been exaggerated for the sake of illustration, in actual practice, the clearance provided being from two to four one thousandths of an inch.

When the handle 33 is rotated manually in the opposite direction the tapered head 21 enters the bore 11 and gradually obstructs the flow of water so that at the time the compressible valve head 23 engages the seat 12 the flow has been decreased to such an extent that no appreciable vibration results from the final closing off of the water.

Obviously the amount of retraction of the tapered head 21 from the bore 11 governs the rate of flow of water through the bore 11, and the amount of retraction of the head 21 is determined by the amount of movement of the valve element 15. To limit the amount of movement of the head 21 the set screw 18 may be adjusted so that engagement thereof with the end of the bore 13 will provide a positive movement limit for the valve element 15.

When the head 21 is positioned substantially as shown in Fig. 7 the bottom thereof is approximately level with the top of the bore 11, and it has been found that with the head 21 so positioned the water passing the same to enter the bore 11 becomes foamy. Such foaminess is undesirable and is eliminated by the grooves 21a which permit less restricted flow of water when the head is so positioned than would ordinarily occur at this time, with the result that the head 21 may be moved into or out of the bore 11 without foaming of the water occurring at any stage of the movement thereof.

One advantage of the present type of valve is that the valve elements or the valve heads 23 may be readily replaced in the event of wear by inexperienced persons while such inexperienced persons cannot remove the shaft 25 and gear segment 29.

Although a specific embodiment of the present invention has been illustrated and described it will be understood that various changes may be made within the scope of the appended claims without departing from the spirit of the invention, and such changes are contemplated.

What I claim is:—

1. In a faucet, a body having an inlet and an outlet, a valve seat in said body between said inlet and said outlet, a valve element in said body on the inlet side of said valve seat, a compressible valve head on said element adapted to engage said valve seat, a gradually tapered head on said valve element and adapted to extend through said seat when said compressible head is in engagement therewith, the end of said head which projects through said seat being provided with a plurality of diametric channels of predetermined depth, and means for restricting movement of said valve element in a direction away from said seat whereby when said faucet is fully opened a portion of said tapered head projects through said valve seat and the bottoms of said channels are substantially in a plane with said valve seat.

2. In a faucet, a body having an inlet and an outlet, a valve seat in said body between said inlet and said outlet, a valve element in said body on the inlet side of said valve seat, a compressible valve head on said element adapted to engage said valve seat, a tapered head projecting axially from said compressible head and adapted to extend through said valve seat when said compressible head is in engagement with said valve seat, said tapered head and said valve seat being relatively proportioned whereby to provide a clearance approximating one to five one-thousandths of an inch between the smaller outer end of said tapered head and said valve seat, diametric channels formed in the outer end of said tapered head, and means for restricting movement of said valve element whereby when said compressible head is in its farthest remote position with respect to said seat a portion of said tapered head still projects through said valve seat and the bottoms of said channels are substantially in a plane with said valve seat.

3. In a faucet, a body having an inlet and an outlet, a valve seat in said body between said inlet and said outlet, a valve element in said body on the inlet side of said valve seat, a compressible valve head on said element adapted to engage said valve seat, a gradually tapered head on said valve element and adapted to extend through said seat when said compressible head is in engagement therewith, the end of said head which projects through said seat being provided with a plurality of diametric channels of predetermined depth, and means for restricting movement of said valve element in a direction away from said seat whereby when said faucet is fully opened a portion of said tapered head projects through said valve seat and the bottoms of said channels are substantially in a plane with said valve seat, said restricting means comprising a screwthreaded bore formed in the end of said valve element, a slot entering the end of said element and extending to a depth corresponding to the depth of said bore, and a set screw in said bore.

FRANK E. RICE.